(12) United States Patent
Sunada et al.

(10) Patent No.: US 9,475,895 B2
(45) Date of Patent: Oct. 25, 2016

(54) SULFUR-MODIFIED CHLOROPRENE RUBBER COMPOSITION AND MOLDED BODY

(71) Applicant: DENKI KAGAKU KOGYO KABUSHIKI KAISHA, Tokyo (JP)

(72) Inventors: Takashi Sunada, Itoigawa (JP); Yasushi Abe, Itoigawa (JP); Naoki Kobayashi, Itoigawa (JP)

(73) Assignee: DENKA COMPANY LIMITED, Tokyo (JP)

( * ) Notice: Subject to any disclaimer, the term of this patent is extended or adjusted under 35 U.S.C. 154(b) by 0 days.

(21) Appl. No.: 14/425,510

(22) PCT Filed: Sep. 10, 2013

(86) PCT No.: PCT/JP2013/074381
§ 371 (c)(1),
(2) Date: Mar. 3, 2015

(87) PCT Pub. No.: WO2014/054388
PCT Pub. Date: Apr. 10, 2014

(65) Prior Publication Data
US 2015/0203613 A1 Jul. 23, 2015

(30) Foreign Application Priority Data
Oct. 2, 2012 (JP) ................ 2012-219964

(51) Int. Cl.
| | | |
|---|---|---|
| C08F 36/18 | (2006.01) | |
| C08C 19/20 | (2006.01) | |
| C08K 3/06 | (2006.01) | |
| C08L 11/00 | (2006.01) | |
| C08F 2/38 | (2006.01) | |

(52) U.S. Cl.
CPC ............ C08F 36/18 (2013.01); C08C 19/20 (2013.01); C08K 3/06 (2013.01)

(58) Field of Classification Search
CPC .......... C08C 19/20; C08F 36/18; C08F 2/38; C08K 3/06; C08L 11/00
USPC .......................... 525/292; 526/295
See application file for complete search history.

(56) References Cited

U.S. PATENT DOCUMENTS

| | | | |
|---|---|---|---|
| 3,378,538 A | 4/1968 | Sparks et al. ............... | 260/92.3 |
| 3,397,173 A | 8/1968 | Collette et al. .............. | 260/45.9 |
| 3,595,847 A * | 7/1971 | Mayer-Mader et al. . | C08C 3/00 526/234 |
| 3,808,183 A | 4/1974 | Branlard et al. ............. | 260/92.3 |
| 3,984,609 A | 10/1976 | Branlard et al. ............. | 526/78 |
| 4,255,539 A | 3/1981 | Branlard et al. ............. | 525/220 |
| 2014/0005354 A1 | 1/2014 | Sunada et al. ............... | 528/390 |

FOREIGN PATENT DOCUMENTS

| | | |
|---|---|---|
| JP | 47-2432 | 2/1972 |
| JP | 55-106210 A | 8/1980 |
| JP | 2002-60550 A | 2/2002 |
| JP | 2009-275124 A | 11/2009 |
| WO | WO 2012/157658 A1 | 11/2012 |

OTHER PUBLICATIONS

International Search Report dated Dec. 3, 2013, issued to corresponding International Application, Serial No. PCT/JP2013/074381.

* cited by examiner

Primary Examiner — Fred M Teskin
(74) Attorney, Agent, or Firm — Stein IP, LLC

(57) ABSTRACT

An object of the invention is to provide a sulfur-modified chloroprene rubber composition improved in heat resistance. A sulfur-modified chloroprene rubber composition, comprising a sulfur-modified chloroprene rubber containing sulfur chemically bound thereto and sulfur not chemically bound to the sulfur-modified chloroprene rubber, wherein: the ratio of the amount of sulfur chemically bound to the sulfur-modified chloroprene rubber to the total amount of sulfur in the sulfur-modified chloroprene rubber composition (amount of chemically bound sulfur [mass %]/total amount of sulfur [mass %]) is 0.1 to 0.45; and the sulfur-modified chloroprene rubber has, at the molecular terminal, at least one structure represented by the following General Formula (1) or (2): —S—C(=S)—O—R$^1$ ... (1) (in General Formula (1), R$^1$ represents an alkyl group having 1 to 4 carbon atoms) or —S—R$^2$ ... (2) (in General Formula (2), R$^2$ represents an alkyl group having 8 to 20 carbon atoms).

7 Claims, No Drawings

SULFUR-MODIFIED CHLOROPRENE RUBBER COMPOSITION AND MOLDED BODY

CROSS-REFERENCE TO RELATED APPLICATIONS

This application is a national stage of International Application No. PCT/JP2013/074381, filed Sep. 10, 2013, which claims the benefit of priority to Japanese Application No. 2012-219964, filed Oct. 2, 2012, in the Japanese Patent Office, the disclosure of which is incorporated herein by reference.

TECHNICAL FIELD

The present invention relates to a sulfur-modified chloroprene rubber composition improved in heat resistance and a molded body prepared therefrom.

BACKGROUND ART

Sulfur-modified chloroprene rubbers with their superior dynamic properties have been used as common industrial materials for preparation of drive belts, conveyor belts, automobile air suspensions, antivibration rubbers, and others. These products have a problem that they show a shortened product lifetime when the temperature of use environment is raised. Thus, there exists a need for development of a sulfur-modified chloroprene rubber improved in heat resistance.

Known methods for improving the heat resistance of such a sulfur-modified chloroprene rubber include, for example, a method of plasticizing (peptizing) a sulfur-modified chloroprene rubber in the presence of a special tetraalkylthiuram disulfide (see Patent Document 1) and a method of adding an unsubstituted or substituted thiazolidine-thione-2 and an imidazole group-containing compound (see Patent Document 2).

CITATION LIST

Patent Literatures

[Patent Document 1] JP-A No. 2009-275124
[Patent Document 2] JP-A No. 2002-060550

SUMMARY OF INVENTION

Technical Problem

Sulfur-modified chloroprene rubber compositions obtained by the methods described in Patent Documents 1 and 2 can be used without any problem under normal use condition. However in order to cope with the increasingly severe use environment, there exist a need for development of a sulfur-modified chloroprene rubber composition drastically improved in heat resistance without deterioration of the favorable properties inherent to the sulfur-modified chloroprene rubber.

Accordingly, an object of the present invention is to provide a sulfur-modified chloroprene rubber composition improved in heat resistance without deterioration of the favorable properties inherent to the sulfur-modified chloroprene rubber.

Solution to Problem

Specifically, the present invention provides a sulfur-modified chloroprene rubber composition, comprising a sulfur-modified chloroprene rubber containing sulfur chemically bound thereto and sulfur not chemically bound to the sulfur-modified chloroprene rubber, wherein the ratio of the amount of sulfur chemically bound to the sulfur-modified chloroprene rubber to the total amount of sulfur in the sulfur-modified chloroprene rubber composition (amount of chemically bound sulfur [mass %]/total amount of sulfur [mass %]) is 0.1 to 0.45 and the sulfur-modified chloroprene rubber has, at the molecular terminal, at least one structure represented by the following General Formula (1) or (2):

(in General Formula (1), $R^1$ represents an alkyl group having 1 to 4 carbon atoms) or

(in General Formula (2), $R^2$ represents an alkyl group having 8 to 20 carbon atoms).

The amount of sulfur chemically bound to the sulfur-modified chloroprene rubber may be 0.05 to 0.25 mass % in 100 mass % of the sulfur-modified chloroprene rubber. The sulfur-modified chloroprene rubber may have, at the molecular terminal, at least one structure represented by General Formula (1) or (2) in an amount of 0.01 to 0.25 mass % in 100 mass % of the sulfur-modified chloroprene rubber.

The structure at the molecular terminal of the sulfur-modified chloroprene rubber may be a structure derived from a dialkylxanthogen disulfide or an alkylmercaptan. In this case, the dialkylxanthogen disulfide may be at least one compound selected from the group consisting of dimethylxanthogen disulfide, diethylxanthogen disulfide, diisopropylxanthogen disulfide, and diisobutylxanthogen disulfide, and the alkylmercaptan may be at least one compound selected from the group consisting of n-dodecylmercaptan, tert-dodecyloctylmercaptan, and octylmercaptan.

The sulfur-modified chloroprene rubber composition may have a Mooney viscosity of 25 to 60.

The present invention also provides a molded body prepared from the sulfur-modified chloroprene rubber composition according to the present invention.

Advantageous Effects of Invention

It is possible according to the present invention to obtain a sulfur-modified chloroprene rubber composition improved in heat resistance without deterioration of the favorable properties inherent to the sulfur-modified chloroprene rubber.

DESCRIPTION OF EMBODIMENTS

Hereinafter, embodiment of the invention will be described in detail. It should be understood that the present invention is not limited to the embodiments described below.
<Sulfur-Modified Chloroprene Rubber Composition>

The sulfur-modified chloroprene rubber composition according to the present invention comprises a sulfur-modified chloroprene rubber containing sulfur chemically bound thereto and sulfur not chemically bound to the sulfur-modified chloroprene rubber. In addition in the sulfur-modified chloroprene rubber composition, the ratio of the sulfur chemically bound to the sulfur-modified chloroprene rubber to the total amount of sulfur in the sulfur-modified chloroprene rubber composition is 0.1 to 0.45. Further in the sulfur-modified chloroprene rubber composition, the sulfur-modified chloroprene rubber has a particular structure described below at the molecular terminal.

The "sulfur-modified chloroprene rubber," as used herein, means a chloroprene rubber containing sulfur chemically bound to the main or side chains or the terminals of the molecule. The sulfur-modified chloroprene rubber for use is favorably a chloroprene rubber containing sulfur chemically bound to the main chains of the molecule.

The "amount of sulfur chemically bound to the sulfur-modified chloroprene rubber" means the content (mass %) of the sulfur chemically bound to the sulfur-modified chloroprene rubber in the sulfur-modified chloroprene rubber.

The content of sulfur chemically bound to the sulfur-modified chloroprene rubber can be determined according to the Oxygen Flask Combustion Method described in JIS K 6233-1, after a sample is obtained by purifying the sulfur-modified chloroprene rubber composition with a mixture solution of benzene and methanol at a rate of 3:5 for removal of sulfur ($S_8$) not chemically bound to polymer chains of the sulfur-modified chloroprene rubber and also sulfur-containing compounds such as polymerization catalysts, aging inhibitors, polymerization inhibitors, and plasticizers, and freeze-drying the purified product once again.

The "total amount of sulfur" is the total content (mass %) of all sulfur contained in the sulfur-modified chloroprene rubber composition. It is specifically the total amount of sulfur chemically bound to the sulfur-modified chloroprene rubber, sulfur ($S_8$) not chemically bound, and the sulfur components derived from the polymerization catalysts, chain-transfer agents, aging inhibitors, and polymerization inhibitors contained in the sulfur-modified chloroprene rubber composition.

The total amount of sulfur in sulfur-modified chloroprene rubber composition can be determined by measuring the sulfur content of the sulfur-modified chloroprene rubber composition obtained, as it is without purification, according to the Oxygen Flask Combustion Method described in JIS K 6233-1.

In the sulfur-modified chloroprene rubber composition according to the present invention, the ratio of the amount of sulfur chemically bound to the sulfur-modified chloroprene rubber to the total amount of sulfur in the sulfur-modified chloroprene rubber composition (amount of chemically bound sulfur [mass %]/total amount of sulfur [mass %]) is regulated to be in the range of 0.1 to 0.45.

When the content ratio is less than 0.1, it may not be possible to improve the heat resistance of the sulfur-modified chloroprene rubber composition obtained or may lead to loss of the adhesiveness thereof to metals and fibers. Alternatively when the content ratio is more than 0.45, such a sulfur-modified chloroprene rubber composition can be prepared only with difficulty, as it demands an extremely high-temperature high-pressure condition for production.

A content ratio of the amount of sulfur chemically bound to the sulfur-modified chloroprene rubber to the total amount of sulfur in the sulfur-modified chloroprene rubber composition is preferably in the range of 0.15 to 0.40, as it leads to larger improvement in heat resistance of the sulfur-modified chloroprene rubber composition obtained.

The content ratio of the amount of sulfur chemically bound to the sulfur-modified chloroprene rubber to the total amount of sulfur in the sulfur-modified chloroprene rubber composition can be regulated, for example, by modification of the chain-transfer agent, such as dialkylxanthogen disulfide or alkylmercaptan, added during polymerization of chloroprene or by adjustment of the polymerization degree of the sulfur-modified chloroprene rubber.

The amount of sulfur chemically bound to the sulfur-modified chloroprene rubber is not particularly limited, but preferably 0.05 to 0.25 mass % in the sulfur-modified chloroprene rubber. It is possible by adjusting the content of sulfur chemically bound to the sulfur-modified chloroprene rubber in the range above to improve the heat resistance of the sulfur-modified chloroprene rubber composition obtained without deterioration of adhesiveness to metals and fibers. The amount of sulfur chemically bound to the sulfur-modified chloroprene rubber is more preferably in the range of 0.1 to 0.25 mass % and still more preferably in the range of 0.1 to 0.2 mass %. It is possible by adjusting the sulfur content in such a range to improve further the heat resistance of the sulfur-modified chloroprene rubber composition obtained.

The content of sulfur chemically bound to the sulfur-modified chloroprene rubber can be regulated, for example, by adjusting the addition amounts of sulfur ($S_8$) and the sulfur-containing compounds containing one or more sulfur atoms in the molecule added during polymerization of chloroprene or by adjusting the polymerization degree of the sulfur-modified chloroprene rubber.

The sulfur-modified chloroprene rubber in the sulfur-modified chloroprene rubber composition according to the present invention has, at the molecular terminal, at least one structure represented by the following General Formula (1) or (2). The molecular terminal of the sulfur-modified chloroprene rubber having such a particular structure may be the terminal of the main or branched chain of the molecule, but preferably the terminal of the main chain. It is possible, when the sulfur-modified chloroprene rubber has such a terminal structure, to increase the effectiveness of improving the heat resistance of the sulfur-modified chloroprene rubber composition obtained without deterioration of the favorable adhesiveness to metals and fibers.

$$-S-C(=S)-O-R^1 \qquad (1)$$

(in General Formula (1), $R^1$ represents an alkyl group having 1 to 4 carbon atoms) and

$$-S-R^2 \qquad (2)$$

(in General Formula (2), $R^2$ represents an alkyl group having 8 to 20 carbon atoms).

The alkyl group represented by $R^1$ or $R^2$ in General Formula (1) or (2) may be a straight-chain, branched, or cyclic group. In addition, part or all of the hydrogen atoms in the alkyl group may be replaced with other atoms.

Examples of $R^1$ in General Formula (1) above include methyl, ethyl, n-propyl, isopropyl, n-butyl, sec-butyl, isobutyl, tert-butyl, cyclobutyl, and the like. Among them, $R^1$ is preferably a methyl, ethyl, isopropyl, or isobutyl group.

Examples of $R^2$ in General Formula (2) above include octyl, nonyl, decyl, dodecyl, pentadecyl, octadecyl, tert-dodecyloctyl, cyclooctyl, and the like. Among them, $R^2$ is preferably an octyl, n-dodecyl, or tert-dodecyloctyl group, and more preferably a tert-dodecyloctyl group.

For introduction of at least one structure represented by General Formula (1) or (2) above to the molecular terminal of the sulfur-modified chloroprene rubber, for example, a chain-transfer agent may be added during polymerization of chloroprene and the molecular weight of the polymer may thus be regulated during emulsion polymerization. When a chain-transfer agent is added during polymerization of chloroprene, the chain-transfer agent reacts radically with the terminal of the polymerizing chloroprene, terminating the polymerization reaction of chloroprene. At least one structure represented by General Formula (1) or (2) is then introduced to the molecular terminal of the sulfur-modified chloroprene rubber.

The chain-transfer agent for use may be at least one compound selected from dialkylxanthogen disulfides, and alkylmercaptans. These chain-transfer agents, when used, modify the structure at the molecular terminal of the sulfur-modified chloroprene rubber into a more favorable structure with a structure derived from at least one compound selected from dialkylxanthogen disulfides and alkylmercaptans.

One alkyl group in the dialkylxanthogen disulfides preferably has 1 to 4 carbon atoms. The alkyl group in the alkylmercaptans preferably has 8 to 20 carbon atoms.

The dialkylxanthogen disulfide is preferably at least one compound selected from the group consisting of dimethylxanthogen disulfide, diethylxanthogen disulfide, diisopropylxanthogen disulfide, and diisobutylxanthogen disulfide.

The alkylmercaptan is preferably at least one compound selected from the group consisting of n-dodecylmercaptan, tert-dodecyloctylmercaptan, and octylmercaptan.

The chain-transfer agent is more preferably at least one compound selected from the group consisting of dimethylxanthogen disulfide, diethylxanthogen disulfide, diisopropylxanthogen disulfide, diisobutylxanthogen disulfide, and tert-dodecyloctylmercaptan.

The amount of the chain-transfer agent used is not particularly limited, but preferably 0.01 to 0.6 parts by mass and more preferably 0.03 to 0.5 parts by mass, with respect to 100 parts by mass of all monomers to be polymerized.

The content of the structure represented by General Formula (1) or (2) at the molecular terminal of the sulfur-modified chloroprene rubber is not particularly limited, but preferably adjusted in the range of 0.01 to 0.25 mass % with respect to 100 mass % of the sulfur-modified chloroprene rubber. It is possible by adjusting the content of the particular structure at the molecular terminal in the range above to improve the heat resistance of the sulfur-modified chloroprene rubber composition obtained without deterioration of its processability. The content of the particular structure at the molecular terminal is preferably in the range of 0.01 to 0.2 mass %. It is possible by adjusting the content in the range above to increase the effectiveness of improving the heat resistance of the sulfur-modified chloroprene rubber composition obtained without deterioration of its processability.

The content of the particular structure at the molecular terminal of the sulfur-modified chloroprene rubber can be determined from the peak area in $^1$H-NMR spectrum, after a sample is obtained by purifying the sulfur-modified chloroprene rubber with benzene and methanol and freeze-drying the product additionally and dissolved in deuterated chloroform.

<Preparation of Sulfur-Modified Chloroprene Rubber>

The sulfur-modified chloroprene rubber is a polymer obtained by emulsion-polymerizing sulfur ($S_8$) with 2-chloro-1,3-butadiene (hereinafter, referred to as chloroprene) alone or with chloroprene and one or more monomers copolymerizable therewith in the presence of a dialkylxanthogen disulfide represented by the following General Formula (3) and/or an alkylmercaptan represented by General Formula (4).

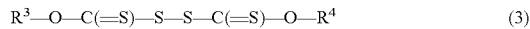

$$R^3\text{—O—C}(=S)\text{—S—S—C}(=S)\text{—O—}R^4 \quad (3)$$

(in General Formula (3), $R^3$ and $R^4$ each independently represent an alkyl group having 1 to 4 carbon atoms)

$$H\text{—S—}R^5 \quad (4)$$

(in General Formula (4), $R^5$ represents an alkyl group having 8 to 20 carbon atoms)

Each of the alkyl groups represented by $R^3$ to $R^5$ in General Formula (3) and (4) above may be a straight-chain, branched, or cyclic group. In addition, part or all of hydrogen atoms in the alkyl group may be replaced with other atoms.

Typical examples of $R^3$ and $R^4$ in General Formula (3) above are the same as those described for $R^1$ in General Formula (1) above. Alternatively, typical examples of $R^5$ in General Formula (4) above are the same as those described for $R^2$ in General Formula (2) above.

Examples of the monomers copolymerizable with chloroprene include 2,3-dichloro-1,3-butadiene, 1-chloro-1,3-butadiene, styrene, acrylonitrile, methacrylonitrile, isoprene, butadiene, methacrylic acid, the esters thereof, and the like. When such a monomer copolymerizable with chloroprene is used, the monomer can be used in an amount that does not impair the properties of the sulfur-modified chloroprene rubber obtained. The amount of the monomer copolymerizable with chloroprene used is preferably 10 mass % or less in all monomers, from the viewpoint above. When the amount of the monomer used is more than 10 mass %, it may not be possible to improve the heat resistance of the sulfur-modified chloroprene rubber obtained and may lead to deterioration in processing properties of the sulfur-modified chloroprene rubber obtained. These copolymerizable monomers may be used alone or in combination of two or more.

For example among the copolymerizable monomers above, use of 2,3-dichloro-1,3-butadiene leads to decrease of the crystallization rate of the sulfur-modified chloroprene rubber obtained. A sulfur-modified chloroprene rubber with lower crystallization rate can retain its rubber elasticity even under low-temperature environment. It is possible, for example, to improve the low temperature compression set of the sulfur-modified chloroprene rubber obtained by copolymerizing chloroprene with a monomer that can lower the crystallization rate.

The amount of sulfur ($S_8$) added during emulsion polymerization is preferably 0.01 to 0.6 parts by mass, more preferably 0.1 to 0.5 parts by mass with respect to 100 parts by mass of all monomers to be polymerized. When the amount of sulfur ($S_8$) added is less than 0.01 parts by mass, it may not be possible to obtain favorable mechanical properties and dynamic properties of the sulfur-modified chloroprene rubber composition obtained. Alternatively when the amount of sulfur ($S_8$) is more than 0.6 parts by mass, the sulfur-modified chloroprene rubber composition obtained may become too adhesive to metals, prohibiting processing.

The emulsifier used in the emulsion polymerization is favorably a rosin acid. Other emulsifiers commonly used and fatty acids described below can be used additionally as the emulsifiers. Examples of the other emulsifiers include metal salts of aromatic sulfonic acid formalin condensates, sodium dodecylbenzenesulfonate, potassium dodecylbenzenesulfonate, sodium alkyldiphenylethersulfonates, potassium alkyldiphenylethersulfonates, sodium polyoxyethylene alkylethersulfonates, sodium polyoxypropylene alkylethersulfonates, potassium polyoxyethylene alkylethersulfonates, potassium polyoxypropylene alkylethersulfonates, and the like. The rosin acid, as used herein, means for example a rosin acid, a disproportionated rosin acid, an alkali metal salt of a disproportionated rosin acid, or a compound thereof. The emulsifier favorably used is an alkali-metal salt of a disproportionated rosin acid, an aqueous alkali soap solution containing a mixture of saturated or unsaturated fatty acids having 6 to 22 carbon atoms. Examples of the constituent components of the disproportionated rosin acid include sesquiterpenes, 8,5-isopimaric acid, dihydropimaric acid, secodehydroabietic acid, dihydroabietic acid, deisopropyldehydroabietic acid, demethyldehydroabietic acid, and the like.

The pH of the aqueous emulsion when the emulsion polymerization starts is desirably 10.5 or more. The aqueous emulsion, as used herein, means a mixture solution containing chloroprene monomers and monomers copolymerizable with chloroprene, emulsifiers, sulfur ($S_8$), and others immediately before initiation of the emulsion polymerization, but also means a solution different in composition when these monomers, sulfur ($S_8$), or other components are added later or as they are divided. When the pH is less than 10.5, if a rosin acid is used as the emulsifier, it may not be possible to regulate the polymerization reliably due to precipitation of the polymer and the like during polymerization. The pH of the aqueous emulsion can be regulated properly by modification of the amount of the alkali component, such as sodium hydroxide or potassium hydroxide, present during emulsion polymerization.

The polymerization temperature of emulsion polymerization is 0 to 55° C., preferably 30 to 55° C., from the viewpoint of controllability of polymerization and productivity.

The polymerization initiator for use is a compound commonly used in radical polymerization such as potassium persulfate, benzoyl peroxide, ammonium persulfate, or hydrogen peroxide. The polymerization is carried out to a polymerization degree in the range of 60 to 95%, preferably in the range of 70 to 90%, and then terminated by addition of a polymerization inhibitor.

The polymerization degree is preferably 60% or more from the viewpoint of productivity. The polymerization degree is preferably 95% or less for inhibition of development of branched structures and generation of gel, which have adverse effects on the processability of the sulfur-modified chloroprene rubber obtained. Examples of the polymerization inhibitors for the polymer include thiodiphenylamine, 4-tert-butylcatechol, 2,2'-methylene-bis-4-methyl-6-tert-butylphenol, and the like. The polymerization inhibitors may be used alone or in combination of two or more.

Unreacted monomers in the polymer solution obtained after polymerization can be removed by a common method such as distillation under reduced pressure.

The molecular weight (Mooney viscosity) of the sulfur-modified chloroprene rubber is generally regulated in the plasticization step described below. As described above in the present embodiment, the method of regulating the molecular weight during emulsion polymerization, using a chain-transfer agent, is employed for introduction of at least one structure represented by General Formula (1) or (2) above to the molecular terminal of the sulfur-modified chloroprene rubber simultaneously with adjustment of molecular weight.

In the "Preparation of sulfur-modified chloroprene rubber" of the present embodiment, the amounts of the compound that can be used as the chain-transfer agent and the chain-transfer agent are as those described for the "sulfur-modified chloroprene rubber composition" of the present embodiment described above.

The chain-transfer agent may be added before initiation of emulsion polymerization or during emulsion polymerization. The chain-transfer agent may be added in portions before and after initiation of emulsion polymerization, depending on the amount of the chain-transfer agent added.

At least one plasticizer selected from the group consisting of tetraalkylthiuram disulfides having alkyl groups having 1 to 7 carbon atoms and salts of dialkyldithiocarbamic acids having alkyl groups having 1 to 7 carbon atoms is added to the sulfur-modified chloroprene rubber composition thus obtained in the plasticization step. Addition of the plasticizer to the sulfur-modified chloroprene rubber composition leads to cleavage of the molecular chains of the polymer, leading to reduction of length of the polymer molecular chain of the sulfur-modified chloroprene rubber to a degree suitable for processing (i.e., to a Mooney viscosity in a suitable range).

These compounds may be added to the aqueous emulsion after emulsion polymerization in advance to removal of the unreacted monomers from the aqueous emulsion or to the aqueous emulsion after removal of the unreacted monomers. In addition, they may be added both before and after removal of the unreacted monomers, depending on the amount of the plasticizer added.

The Mooney viscosity of the sulfur-modified chloroprene rubber composition is preferably adjusted in a range of 25 to 60, although the favorable range is not particularly limited thereto. It is possible by adjusting the Mooney viscosity of the sulfur-modified chloroprene rubber composition in the range above to make the resulting sulfur-modified chloroprene rubber composition retain its favorable processability.

In the sulfur-modified chloroprene rubber composition, a small amount of a stabilizer may be added to the polymer for the prevention of change in Mooney viscosity during storage. Examples of such a stabilizer include phenyl-α-naphthylamine, octylated diphenylamines, 2,6-di-tertiary-butyl-4-phenylphenol, 2,2'-methylene-bis(4-methyl-6-tertiary-butylphenol), 4,4'-thiobis-(6-tertiary-butyl-3-methylphenol), and the like. These stabilizers may be used alone or in combination of two or more. Among the stabilizers above, 4,4'-thiobis-(6-tertiary-butyl-3-methylphenol) is preferable.

<Molded Body>

The sulfur-modified chloroprene rubber composition obtained can be molded and then cured, or cured and then molded, into a desired shape after it is mixed with a metal compound, a plasticizer, a filler, and others, for example by means of a roll, Banbury mixer, or extruder, to give molded bodies such as drive belts, conveyor belts, hoses, automobile air suspensions, antivibration rubbers, and sponges.

The metal compound is added to regulate the curing rate of the sulfur-modified chloroprene rubber composition or to suppress degradation of the sulfur-modified chloroprene rubber composition, by absorbing and thus removing chlorine sources such as hydrogen chloride generated in dehydrochlorination reaction of the sulfur-modified chloroprene rubber composition.

The amount of the metal compound added is not particularly limited, but preferably in the range of 3 to 15 parts by mass with respect to 100 parts by mass of the sulfur-modified chloroprene rubber. It is possible to improve the tear strength of the sulfur-modified chloroprene rubber composition obtained by adjusting the addition amount of the metal compound in the range above.

Examples of the metal compounds for use include oxides and hydroxides of metals such as zinc, titanium, magnesium, lead, iron, beryllium, calcium, barium, germanium, zirconium, vanadium, molybdenum and tungsten.

The plasticizer is added to reduce the hardness of the sulfur-modified chloroprene rubber composition and thus to improve the low-temperature properties thereof. It is also possible to improve the texture of the sponge of the sulfur-modified chloroprene rubber composition when it is produced.

The amount of the plasticizer added is not particularly limited, but preferably in the range of 50 parts by mass or less with respect to 100 parts by mass of the sulfur-modified chloroprene rubber. It is possible by adjusting the addition amount of the plasticizer in the range above to make the resulting sulfur-modified chloroprene rubber composition show the favorable effects above and yet retain the tear strength thereof. Examples of the plasticizers include dioctyl phthalate, dioctyl adipate {bis(2-ethylhexyl adipate)}, white oils, silicone oils, naphthene oils, aroma oils, triphenyl phosphate, tricresyl phosphate, and the like. These plasticizers may be used alone or in combination of two or more.

The filler is added as reinforcing material for the sulfur-modified chloroprene rubber composition. The amount of the filler added is not particularly limited, but preferably in the range of 100 parts by mass or less with respect to 100 parts by mass of the sulfur-modified chloroprene rubber. It is possible by adjusting the addition amount of the filler in the range above to make the resulting sulfur-modified chloroprene rubber composition show the favorable effects above and yet retain the favorable molding processability thereof. Examples of the fillers include carbon black, silica, clay, talc, calcium carbonate, and the like. These fillers may be used alone or in combination of two or more.

EXAMPLES

Hereinafter, the present invention will be described more in detail with reference to Examples and Comparative Examples, but it should be understood that the present invention is not limited to these Examples.

Example 1

Preparation of Sulfur-Modified Chloroprene Rubber Composition 100 parts by mass of monomeric chloroprene, 0.35 parts by mass of sulfur, 0.1 parts by mass of diisopropylxanthogen disulfide, 105 parts by mass of pure water, 3.70 parts by mass of potassium salt of a disproportionated rosin acid (manufactured by Harima Chemicals, Inc.), 0.55 parts by mass of sodium hydroxide, and 0.5 parts by mass of sodium salt of a β-naphthalenesulfonic acid formalin condensate (trade name: DEMOL N, manufactured by Kao Corporation) were placed in a polymerization tank having a capacity of 30 liters. 0.1 parts by mass of potassium persulfate as polymerization initiator was added thereto and the mixture was allowed to polymerize at a polymerization temperature of 40° C. under nitrogen stream. The pH of the emulsion was 12.8 when the polymerization started. When the polymerization degree reached 78%, diethyl hydroxyamine as a terminator was added thereto for the termination of the polymerization. Unreacted monomers were removed by distillation of the polymer solution after the polymerization under reduced pressure, to give a post-polymerization latex before plasticization (hereinafter, this post-polymerization latex will be referred to as "latex").

A plasticizer emulsion consisting of 3.0 parts by mass of monomeric chloroprene, 2.0 parts by mass of tetraethylthiuram disulfide (trade name: Nocceler TET, manufactured by Ouchi Shinko Chemical Industry Co., Ltd.), 0.05 parts by mass of sodium salt of the β-naphthalenesulfonic acid formalin condensate, and 0.05 parts by mass of sodium laurylsulfate was then added to the latex and the mixture was heated under agitation at a temperature of 50° C. for 1 hour for plasticization.

The latex was then cooled and adjusted to a latex pH of 6.0 by addition of acetic acid and the polymer is isolated by a common freeze-coagulation method, to give a sulfur-modified chloroprene rubber composition.

<Determination of the Amount of Sulfur Chemically Bound to the Sulfur-Modified Chloroprene Rubber>

The amount of sulfur chemically bound to the sulfur-modified chloroprene rubber (hereinafter, referred to as "amount of chemically bound sulfur") was determined in the following manner:

Sulfur ($S_8$) not chemically bound to the polymer chain of the sulfur-modified chloroprene rubber and sulfur-containing compounds such as polymerization catalysts, aging inhibitors, polymerization inhibitors, and plasticizers were removed from the sulfur-modified chloroprene rubber composition obtained, by washing it with a mixture solution of benzene and methanol (benzene:methanol=3:5). The sulfur-modified chloroprene rubber composition was then freeze-dried additionally, to give a sample. The amount of the chemically bound sulfur was determined by the Oxygen Flask Combustion Method specified by JIS K 6233-1. The amount of sulfur chemically bound to the sulfur-modified chloroprene rubber obtained was 0.18 mass % with respect to 100 mass % of the polymer.

<Determination of the Ratio of the Amount of Chemically Bound Sulfur to the Total Amount of Sulfur>

The total amount of sulfur of the sulfur-modified chloroprene rubber composition was determined, as it was without purification, by the Oxygen Flask Combustion Method described in JIS K 6233-1. The ratio was calculated from the value obtained and the amount of chemically bound sulfur described above according to the following Formula:

Ratio of the amount of chemically bound sulfur to total amount of sulfur=(amount of chemically bound sulfur)/(total amount of sulfur)

The ratio of the amount of chemically bound sulfur in the sulfur-modified chloroprene rubber obtained to the total amount of sulfur in the sulfur-modified chloroprene rubber composition was found to be 0.2.

<Determination of Molecular Terminal Structure>

The sulfur-modified chloroprene rubber composition was purified with benzene and methanol and freeze-dried additionally, to give a sample. It was then dissolved in 5% deuterated chloroform and $^1$H-NMR spectrum of the solution was determined in JNM-ECX-400 (400 MHz, FT-type) manufactured by JEOL Ltd. The data obtained were corrected with the chloroform H peak (7.24 ppm) of the deuterated chloroform used as solvent. The content of the (xanthogen-modified) structure represented by General Formula (1) above was calculated from the area of the peaks having a peak top at 3.99 to 4.11 ppm and 3.82 to 3.93 ppm. The content of the (mercaptan-modified) structure represented by General Formula (2) above was calculated from the area of the peaks having a peak top at 3.38 to 3.43 ppm, 3.30 to 3.36 ppm, and 3.20 to 3.28 ppm.

In the case of Example 1, the content of the structure represented by General Formula (1) in the sulfur-modified chloroprene rubber obtained was 0.04 mass %.

In Tables 1 to 3, the content of the structure represented by General Formula (1) is shown in the column of "Molecular terminal structure, xanthogen-modified terminal," and the content of the structure represented by General Formula (2) in the column of "Molecular terminal structure, mercaptan-modified terminal."

<Evaluation of Heat Resistance>

100 parts by mass of a sulfur-modified chloroprene rubber composition, 1 part by mass of stearic acid, 2 parts by mass of an octylated diphenylamine, 4 parts by mass of magnesium oxide, 40 parts by mass of carbon black (SRF), and 5.0 parts by mass of zinc oxide were mixed, using an 8-inch roll, and press-cured at 160° C. for 20 minutes, to give a sample for evaluation.

For evaluation of the heat resistance, the elongation at break of the sample for evaluation prepared was determined before and after heat treatment of 100° C.×500 hours according to JIS K6257, and the retention rate of the elongation at break (%) was calculated according to the Formula below. High retention rate of elongation at break (%) indicates that the sample is more heat resistant.

Retention rate of elongation at break (%)=(Elongation at break after heat treatment)/(Elongation at break before heat treatment)×100

The retention rate of elongation at break of the sample obtained in Example 1 was 64%.

<Determination of Compression Set at Low Temperature>

The compression set at low temperature was determined according to JIS K 6262 under the test condition of 0° C. and 70 hours.

The compression set at low temperature of the sample obtained in Example 1 was 93%.

<Preparation of Chloroprene Rubber Latex for Treatment of Fiber Codes>

100 parts by mass of monomeric chloroprene, 3.0 parts by mass of 2,3-dichloro-1,3-butadiene, 0.5 parts by mass of sulfur, 105 parts by mass of pure water, 4.80 parts by mass of potassium salt of a disproportionated rosin acid (manufactured by Harima Chemicals, Inc.), 0.75 parts by mass of sodium hydroxide, and 0.6 parts by mass of sodium salt of a β-naphthalenesulfonic acid formalin condensate (trade name: DEMOL N, manufactured by Kao Corporation) were placed in a polymerization tank having a capacity of 30 liters.

0.1 parts by mass of potassium persulfate as polymerization initiator was added to the polymer solution and the mixture was allowed to polymerize at a polymerization temperature of 40° C. under nitrogen stream. When the conversion rate reached 71%, diethyl hydroxyamine as a polymerization inhibitor was then added thereto for termination of the polymerization and unreacted monomers were removed by distillation of the latex obtained under reduced pressure.

Subsequently, a plasticizer emulsion consisting of 3.0 parts by mass of chloroprene, 2.7 parts by mass of tetraethylthiuram disulfide (trade name: Nocceler TET, manufactured by Ouchi Shinko Chemical Industry Co., Ltd.), 0.05 parts by mass of sodium salt of a β-naphthalenesulfonic acid formalin condensate, and 0.05 parts by mass of sodium laurylsulfate was added to the latex and the mixture was heated under agitation at a temperature of 50° C. for 1 hour for plasticization, to give a latex (A) for RFL treatment.

<RFL Treatment>

First, 1 mol of resorcin and 2 mol of aqueous 37 mass % formaldehyde solution were mixed under agitation. The solution was agitated with 0.75 mol of aqueous 5 mass % NaOH solution and adjusted to a solid matter concentration of 6.9 mass %. The solution was stored in a sealed state at 25° C.±1° C. for 6 hours, to give an RF (resorcin and formaldehyde) solution. The RF solution and the latex (A) described above (resorcin, formaldehyde, and latex) were then mixed and adjusted to give an RFL solution. An untreated polyester fiber code was immersed in the RFL solution for 15 seconds, wrung tightly, dried in a constant-temperature dryer at 120° C. for 2 minutes, baked at 150° C. for 6 minutes, and heat-set additionally at 200° C. for 3 minutes.

<Preparation of a Sample for Evaluation in H Test>

100 parts by mass of the sulfur-modified chloroprene rubber composition of Example 1, 1 part by mass of stearic acid, 2 parts by mass of octylated diphenylamine, 4 parts by mass of magnesium oxide, 40 parts by mass of carbon black (SRF), and 5.0 parts by mass of zinc oxide were mixed, using a 8-inch roll, and sheeted into a stripe-shaped rubber sheet (B) for evaluation, having a sheet length of 120 mm, a sheet width of 5.4 mm, and a thickness of 2.2 mm.

A fabric previously cut to a predetermined size and a rubber sheet (B) for evaluation were placed in a mold having code grooves having a width of 0.8 mm and a depth of 3.0 mm at a fiber code distance of 25.0 mm; a RFL-treated fiber code was placed in the groove; a rubber sheet (B) for evaluation and a cloth are placed thereon in that order; and the composite was press-cured at 160° C. for 20 minutes, after the upper mold was connected. The sample obtained after curing was cooled and cut into a H-shaped test piece; it was stored in a temperature-controlled room at 23° C. for 20 hours, to give a sample for H test.

<H Test>

The adhesive strength of the sample for H test prepared by the method described above was determined, using Autograph AGIS-5KN manufactured by Shimadzu Corp. The H test was carried out in a temperature-controlled room at 23° C. under the condition of a tension speed of 5 mm/sec. As a result, the maximum point test force of the sample prepared from the sulfur-modified chloroprene rubber composition of Example 1 was found to be 97 N.

Examples 2 to 15 and Comparative Examples 1 to 3

The sulfur-modified chloroprene rubber compositions of Examples 2 to 15 and Comparative Examples 1 to 3 were prepared and evaluated in a manner similar to Example 1, except that the polymerization condition of Example 1 was replaced with that shown in Tables 1 to 3. The polymerization conditions (components and polymerization degrees) of Examples 1 to 15 and Comparative Examples 1 to 3 and also the evaluation results are shown in Tables 1 to 3.

Although not shown in Tables 1 to 3, it was not possible to obtain a sample having a ratio of the amount of chemically bound sulfur to the total amount of sulfur of 0.5, even if the preparative condition was modified.

TABLE 1

|  |  | Unit | Example 1 | Example 2 | Example 3 | Example 4 | Example 5 | Example 6 |
|---|---|---|---|---|---|---|---|---|
| Polymerization condition | Chloroprene | part by mass | 100 | 100 | 100 | 100 | 100 | 100 |
|  | 2,3-Dichloro-1,3-butadiene | part by mass |  |  |  |  |  |  |
|  | Sulfur | part by mass | 0.35 | 0.35 | 0.35 | 0.1 | 0.1 | 0.1 |
|  | Diisopropylxanthogen disulfide | part by mass | 0.1 | 0.2 | 0.2 | 0.2 | 0.4 | 0.4 |
|  | Dimethylxanthogen disulfide | part by mass |  |  |  |  |  |  |
|  | Diethylxanthogen disulfide | part by mass |  |  |  |  |  |  |
|  | Diisobutylxanthogen disulfide | part by mass |  |  |  |  |  |  |
|  | tert-Dodecyloctylmercaptan | part by mass |  |  |  |  |  |  |
|  | n-Dodecylmercaptan | part by mass |  |  |  |  |  |  |
|  | Octylmercaptan | part by mass |  |  |  |  |  |  |
|  | Polymerization degree | % | 78 | 76 | 85 | 75 | 79 | 95 |
| Analysis and evaluation | Amount of sulfur chemically bound to the sulfur-modified chloroprene rubber | mass % | 0.18 | 0.2 | 0.25 | 0.07 | 0.11 | 0.24 |
|  | Ratio of the amount of chemically bound sulfur to the total amount of sulfur | — |  | 0.2 | 0.2 | 0.26 | 0.13 | 0.2 | 0.44 |
|  | Molecular terminal structure, xanthogen-modified terminal | mass % | 0.04 | 0.11 | 0.11 | 0.08 | 0.21 | 0.22 |
|  | Molecular terminal structure, mercaptan-modified terminal | mass % |  |  |  |  |  |  |
| Evaluation of physical properties | Mooney viscosity | — | 51 | 35 | 50 | 56 | 27 | 49 |
|  | Elongation at break before heat treatment | % | 471 | 485 | 478 | 492 | 503 | 498 |
|  | Retention rate of elongation at break | % | 64 | 59 | 58 | 60 | 67 | 59 |
|  | Compression set at low temperature | % | 93 | 94 | 96 | 93 | 95 | 94 |
|  | H test, maximum point test force | N | 97 | 105 | 101 | 83 | 100 | 101 |

TABLE 2

|  |  | Unit | Example 7 | Example 8 | Example 9 | Example 10 | Example 11 | Example 12 | Example 13 |
|---|---|---|---|---|---|---|---|---|---|
| Polymerization condition | Chloroprene | part by mass | 100 | 100 | 100 | 100 | 100 | 100 | 97 |
|  | 2,3-Dichloro-1,3-butadiene | part by mass |  |  |  |  |  |  | 3 |
|  | Sulfur | part by mass | 0.35 | 0.35 | 0.35 | 0.35 | 0.35 | 0.35 | 0.35 |
|  | Diisopropylxanthogen disulfide | part by mass |  |  |  |  | 0.05 | 0.05 | 0.1 |
|  | Dimethylxanthogen disulfide | part by mass | 0.1 |  |  |  | 0.05 |  |  |
|  | Diethylxanthogen disulfide | part by mass |  | 0.1 |  |  |  |  |  |
|  | Diisobutylxanthogen disulfide | part by mass |  |  | 0.1 |  |  |  |  |
|  | tert-Dodecyloctylmercaptan | part by mass |  |  |  | 0.1 |  | 0.05 |  |
|  | n-Dodecylmercaptan | part by mass |  |  |  |  |  |  |  |
|  | Octylmercaptan | part by mass |  |  |  |  |  |  |  |
|  | Polymerization degree | % | 77 | 75 | 77 | 77 | 75 | 75 | 77 |
| Analysis and evaluation | Amount of sulfur chemically bound to the sulfur-modified chloroprene rubber | mass % | 0.18 | 0.19 | 0.18 | 0.17 | 0.18 | 0.17 | 0.19 |
|  | Ratio of the amount of chemically bound sulfur to the total amount of sulfur | — | 0.17 | 0.2 | 0.2 | 0.18 | 0.18 | 0.19 | 0.19 |
|  | Molecular terminal structure, xanthogen-modified terminal | mass % | 0.05 | 0.05 | 0.04 |  | 0.06 | 0.02 |  |
|  | Molecular terminal structure, mercaptan-modified terminal | mass % |  |  |  | 0.06 |  | 0.03 | 0.05 |
| Evaluation of physical properties | Mooney viscosity | — | 52 | 47 | 47 | 37 | 45 | 42 | 46 |
|  | Elongation at break before heat treatment | % | 469 | 475 | 484 | 480 | 477 | 490 | 500 |
|  | Retention rate of elongation at break | % | 63 | 64 | 65 | 65 | 63 | 64 | 63 |
|  | Compression set at low temperature | % | 94 | 94 | 93 | 94 | 92 | 95 | 51 |
|  | H test, maximum point test force | N | 97 | 94 | 96 | 92 | 93 | 90 | 98 |

TABLE 3

|  |  | Unit | Example 14 | Example 15 | Comparative Example 1 | Comparative Example 2 | Comparative Example 3 |
|---|---|---|---|---|---|---|---|
| Polymerization condition | Chloroprene | part by mass | 100 | 100 | 100 | 100 | 100 |
|  | 2,3-Dichloro-1,3-butadiene | part by mass |  |  |  |  |  |
|  | Sulfur | part by mass | 0.35 | 0.35 | 0.6 | 0.35 | 0.05 |
|  | Diisopropylxanthogen disulfide | part by mass |  |  |  |  | 0.3 |
|  | Dimethylxanthogen disulfide | part by mass |  |  |  |  |  |
|  | Diethylxanthogen disulfide | part by mass |  |  |  |  |  |
|  | Diisobutylxanthogen disulfide | part by mass |  |  |  |  |  |

TABLE 3-continued

|  |  | Unit | Example | | Comparative Example | | |
|---|---|---|---|---|---|---|---|
|  |  |  | 14 | 15 | 1 | 2 | 3 |
|  | tert-Dodecyloctylmercaptan | part by mass |  |  |  |  |  |
|  | n-Dodecylmercaptan | part by mass | 0.1 |  |  |  |  |
|  | Octylmercaptan | part by mass |  | 0.1 |  |  |  |
|  | Polymerization degree | % | 75 | 76 | 79 | 75 | 78 |
| Analysis and evaluation | Amount of sulfur chemically bound to the sulfur-modified chloroprene rubber | mass % | 0.18 | 0.16 | 0.37 | 0.2 | 0.05 |
|  | Ratio of the amount of chemically bound sulfur to the total amount of sulfur | — | 0.2 | 0.18 | 0.27 | 0.19 | 0.08 |
|  | Molecular terminal structure, xanthogen-modified terminal | mass % |  |  |  |  | 0.09 |
|  | Molecular terminal structure, mercaptan-modified terminal | mass % | 0.05 | 0.06 | 0 | 0 |  |
| Evaluation of physical properties | Mooney viscosity | — | 42 | 37 | 50 | 97 | 59 |
|  | Elongation at break before heat treatment | % | 495 | 487 | 488 | The sample could not be prepared because of scorching during kneading. | 477 |
|  | Retention rate of elongation at break | % | 64 | 63 | 45 |  | 49 |
|  | Compression set at low temperature | % | 94 | 92 | 94 |  | 92 |
|  | H test, maximum point test force | N | 90 | 92 | 90 |  | 66 |

The sulfur-modified chloroprene rubber compositions of Examples 1 to 15 had a large maximum point test force in the H test. In addition, the sulfur-modified chloroprene rubber compositions of Examples 1 to 15 had a high retention rate of elongation at break in the range of 58 to 67%.

On the other hand, the sulfur-modified chloroprene rubber of Comparative Example 1, which did not have any molecular terminal structures represented by General Formulae (1) and (2), had a low retention rate of elongation at break of 45%. In Comparative Example 2, the sample could not be prepared because of scorching of the composition during kneading. It is probably because the sulfur-modified chloroprene rubber of Comparative Example 2 did not have any molecular terminal structures represented by General Formulae (1) and (2) similarly to that of Comparative Example 1 and the sulfur content therein is smaller than that of Comparative Example 1. Because the ratio of the amount of sulfur chemically bound to the sulfur-modified chloroprene rubber to the total amount of sulfur in the sulfur-modified chloroprene rubber composition is less than 0.1, the sulfur-modified chloroprene rubber of Comparative Example 3 had a smaller retention rate of elongation at break and a smaller maximum point test force in the H test.

The results in Examples and Comparative Examples above demonstrate that it is possible to improve the heat resistance of the sulfur-modified chloroprene rubber composition according to the present invention, while retaining the favorable properties inherent to the sulfur-modified chloroprene rubber, by adjusting the ratio of the amount of chemically bound sulfur to the total amount of sulfur in a particular range and making the molecular terminal of the sulfur-modified chloroprene rubber have a particular structure.

<Drive Belt>

The compounds used in preparation of the sample for evaluation of heat resistance were mixed with each of the sulfur-modified chloroprene rubber compositions prepared in Examples and Comparative Examples, using an 8-inch roll, and the mixture was molded and cured with various side materials, to give a drive belt. The drive belt obtained from the sulfur-modified chloroprene rubber composition of each Example showed better heat resistance than that obtained from the sulfur-modified chloroprene rubber composition of each Comparative Example, similarly to the samples for evaluation of heat resistance.

<Conveyor Belt>

The compounds used in preparation of the sample for evaluation of heat resistance were mixed with each of the sulfur-modified chloroprene rubber compositions prepared in Examples and Comparative Examples, using an 8-inch roll and the mixture was molded and cured with various side materials, to give a conveyor belt. The conveyor belt obtained from the sulfur-modified chloroprene rubber composition of each Example showed better heat resistance than that obtained from the sulfur-modified chloroprene rubber composition of each Comparative Example, similarly to the samples for evaluation of heat resistance.

<Hose>

The compounds used in preparation of the sample for evaluation of heat resistance were mixed with each of the sulfur-modified chloroprene rubber compositions prepared in Examples and Comparative Examples, using an 8-inch roll and the mixture was molded and cured with various side materials, to give a hose. The hose obtained from the sulfur-modified chloroprene rubber composition of each Example showed better heat resistance than that obtained from the sulfur-modified chloroprene rubber composition of each Comparative Example, similarly to the samples for evaluation of heat resistance.

<Automobile Air Suspension>

The compounds used in preparation of the sample for evaluation of heat resistance were mixed with each of the sulfur-modified chloroprene rubber compositions prepared in Examples and Comparative Examples, using an 8-inch roll and the mixture was molded and cured with various side materials, to give an automobile air suspension. The automobile air suspension obtained from the sulfur-modified chloroprene rubber composition of each Example showed better heat resistance than that obtained from the sulfur-modified chloroprene rubber composition of each Comparative Example, similarly to the samples for evaluation of heat resistance.

<Antivibration Rubber>

The compounds used in preparation of the sample for evaluation of heat resistance were mixed with each of the sulfur-modified chloroprene rubber compositions prepared in Examples and Comparative Examples, using an 8-inch roll and the mixture was molded and cured with various side materials, to give an antivibration rubber. The antivibration rubber obtained from the sulfur-modified chloroprene rubber composition of each Example showed better heat resistance than that obtained from the sulfur-modified chloroprene rubber composition of each Comparative Example, similarly to the samples for evaluation of heat resistance.

<Sponge>

The compounds used in preparation of the sample for evaluation of heat resistance were mixed with each of the sulfur-modified chloroprene rubber compositions prepared in Examples and Comparative Examples, using an 8-inch roll and the mixture was molded and cured with various side materials, to give a sponge. The sponge obtained from the sulfur-modified chloroprene rubber composition of each Example showed better heat resistance than that obtained from the sulfur-modified chloroprene rubber composition of each Comparative Example, similarly to the samples for evaluation of heat resistance.

The invention claimed is:

1. A sulfur-modified chloroprene rubber composition, comprising a sulfur-modified chloroprene rubber containing sulfur chemically bound thereto and sulfur not chemically bound to the sulfur-modified chloroprene rubber, wherein:
    at least one compound selected from dialkylxanthogen disulfides, and alkylmercaptans is used as a chain-transfer agent during polymerization of chloroprene;
    the amount of the chain-transfer agent is 0.05 to 0.2 parts by mass with respect to 100 parts by mass of all monomers to be polymerized;
    the polymerization is carried out to a polymerization degree in the range of 75 to 95%;
    the ratio of the amount of sulfur chemically bound to the sulfur-modified chloroprene rubber to the total amount of sulfur in the sulfur-modified chloroprene rubber composition (amount of chemically bound sulfur [mass %]/total amount of sulfur [mass %]) is 0.1 to 0.45; and
    the sulfur-modified chloroprene rubber has, at the molecular terminal, at least one structure represented by the following General Formula (1) or (2):

—S—C(=S)—O—R1    (1)

(in General Formula (1), R1 represents an alkyl group having 1 to 4 carbon atoms) or

    (2)

(in General Formula (2), R2 represents an alkyl group having 8 to 20 carbon atoms).

2. The sulfur-modified chloroprene rubber composition according to claim 1, wherein the amount of sulfur chemically bound to the sulfur-modified chloroprene rubber is 0.05 to 0.25 mass % in 100 mass % of the sulfur-modified chloroprene rubber.

3. The sulfur-modified chloroprene rubber composition according to claim 1, wherein the sulfur-modified chloroprene rubber has, at the molecular terminal, at least one structure represented by General Formula (1) or (2) in an amount of 0.01 to 0.25 mass % in 100 mass % of the sulfur-modified chloroprene rubber.

4. The sulfur-modified chloroprene rubber composition according to claim 1, wherein the structure at the molecular terminal of the sulfur-modified chloroprene rubber is a structure derived from a dialkylxanthogen disulfide or an alkylmercaptan.

5. The sulfur-modified chloroprene rubber composition according to claim 4, wherein:
    the dialkylxanthogen disulfide is at least one compound selected from the group consisting of dimethylxanthogen disulfide, diethylxanthogen disulfide, diisopropylxanthogen disulfide, and diisobutylxanthogen disulfide; and
    the alkylmercaptan is at least one compound selected from the group consisting of n-dodecylmercaptan, tert-dodecyloctylmercaptan, and octylmercaptan.

6. The sulfur-modified chloroprene rubber composition according to claim 1, wherein the Mooney viscosity thereof is 25 to 60.

7. A molded body, prepared from the sulfur-modified chloroprene rubber composition according to claim 1.

* * * * *